United States Patent
Dayton et al.

(10) Patent No.: US 10,437,024 B2
(45) Date of Patent: Oct. 8, 2019

(54) METHOD OF PRODUCING AN OPTICAL ELEMENT

(71) Applicant: Seek Thermal, Inc., Santa Barbara, CA (US)

(72) Inventors: Scott Dayton, San Jose, CA (US); William J. Parrish, Santa Barbara, CA (US); Joseph G. Finegold, Santa Barbara, CA (US)

(73) Assignee: Seek Thermal, Inc., Goleta, CA (US)

( * ) Notice: Subject to any disclaimer, the term of this patent is extended or adjusted under 35 U.S.C. 154(b) by 78 days.

(21) Appl. No.: 14/817,730

(22) Filed: Aug. 4, 2015

(65) Prior Publication Data

US 2016/0040313 A1 Feb. 11, 2016

Related U.S. Application Data

(60) Provisional application No. 62/033,353, filed on Aug. 5, 2014.

(51) Int. Cl.
*G02B 13/00* (2006.01)
*C25D 7/04* (2006.01)
(Continued)

(52) U.S. Cl.
CPC ....... *G02B 13/008* (2013.01); *B22D 17/2245* (2013.01); *B22D 17/2263* (2013.01);
(Continued)

(58) Field of Classification Search
CPC ............ B22D 17/2245; B22D 17/2263; B22D 21/007; B22D 21/027; B23D 79/005; B23D 79/025; C25D 7/04; C25D 13/12–14; C25D 5/00–56; C25D 9/00–12; C25D 13/00–24; G02B 7/02; G02B 7/028; G02B 13/008; G02B 13/14; G01J 5/0205; G01J 5/0215–022; G01J 5/04; G01J 5/046; G01J 5/047; G01J 5/08; G01J 5/0881–0884; G01J 2005/0077; G01J 2005/065
USPC ..... 29/527.5–527.6; 148/200, 202–203, 538; 266/51, 252; 205/80–333; 204/479, 204/194–297.16, 400–435; 359/350, 359/355–357, 503, 808, 811, 819–820,
(Continued)

(56) References Cited

U.S. PATENT DOCUMENTS

| 4,104,424 A | 8/1978 | Steinbrecher et al. |
| 4,271,358 A * | 6/1981 | Schwarz ............... G01J 5/08 250/338.1 |

(Continued)

OTHER PUBLICATIONS

PCT International Search Report and Written Opinion for PCT/US042826 dated Oct. 16, 2015 in 12 pages.
(Continued)

*Primary Examiner* — Stephone B Allen
*Assistant Examiner* — James McGee
(74) *Attorney, Agent, or Firm* — Knobbe, Martens, Olson & Bear, LLP

(57) ABSTRACT

A process for producing an optical element, which may be suitable for use in an infrared camera with sharp surface features and low emissivity surfaces, including the steps of casting the element in the desired shape in a zinc alloy, deburring the zinc alloy element with a thermal deburring operation, and coating the deburred zinc alloy element with an electrocoating operation.

17 Claims, 4 Drawing Sheets

(51) Int. Cl.
*G01J 5/02* (2006.01)
*B22D 21/02* (2006.01)
*B22D 17/22* (2006.01)
*G01J 5/08* (2006.01)
*C25D 13/14* (2006.01)
*G01J 5/04* (2006.01)
*G02B 13/14* (2006.01)
*B23D 79/00* (2006.01)
*G02B 7/02* (2006.01)
*B22D 21/00* (2006.01)
*G01J 5/00* (2006.01)
*G01J 5/06* (2006.01)

(52) U.S. Cl.
CPC ......... *B22D 21/007* (2013.01); *B22D 21/027* (2013.01); *B23D 79/005* (2013.01); *C25D 7/04* (2013.01); *C25D 13/14* (2013.01); *G01J 5/0215* (2013.01); *G01J 5/046* (2013.01); *G01J 5/0881* (2013.01); *G02B 7/02* (2013.01); *G02B 13/14* (2013.01); *G01J 2005/0077* (2013.01); *G01J 2005/065* (2013.01)

(58) Field of Classification Search
USPC ........ 359/894; 374/121, 124, 126, 127, 130, 374/131, 133; 356/43, 51, 216; 427/160, 427/162; 348/164–165
See application file for complete search history.

(56) References Cited

U.S. PATENT DOCUMENTS

| | | | | |
|---|---|---|---|---|
| 4,721,458 | A * | 1/1988 | Conrad | B22D 31/00 431/1 |
| 5,326,454 | A * | 7/1994 | Engelhaupt | C25D 5/10 205/67 |
| 2002/0162963 | A1* | 11/2002 | Lannestedt | G01J 5/02 250/351 |
| 2005/0226608 | A1* | 10/2005 | Kwon | G02B 1/115 396/91 |
| 2009/0244361 | A1* | 10/2009 | Gebauer | H04N 5/2253 348/373 |
| 2010/0214676 | A1* | 8/2010 | Suda | A61B 1/00096 359/819 |
| 2015/0264231 | A1* | 9/2015 | Murayama | G02B 7/02 348/308 |

OTHER PUBLICATIONS

Johnson, Tim Report 2 Tutorial, *Tutorial: Stray light Scatter and Black Coatings*, dated Dec. 11, 2007, p. 1-10.

* cited by examiner

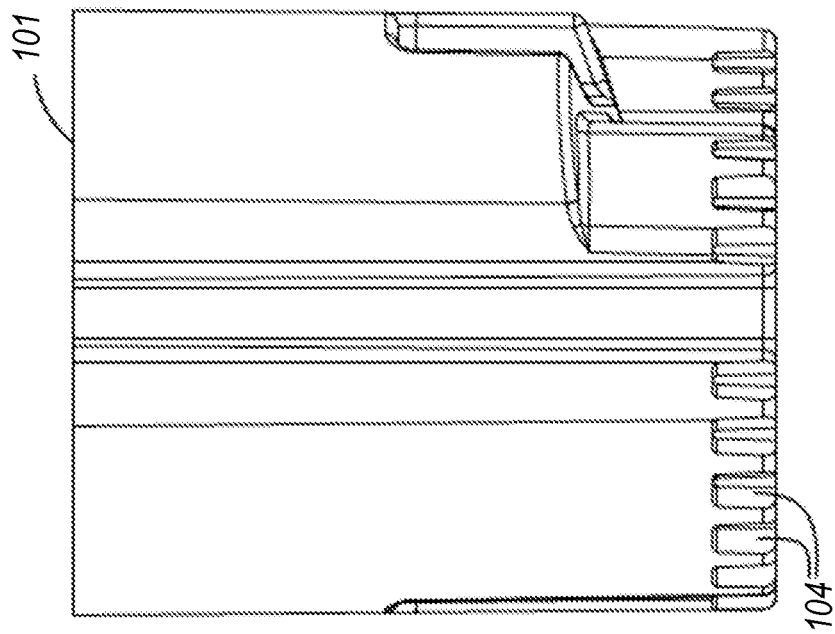
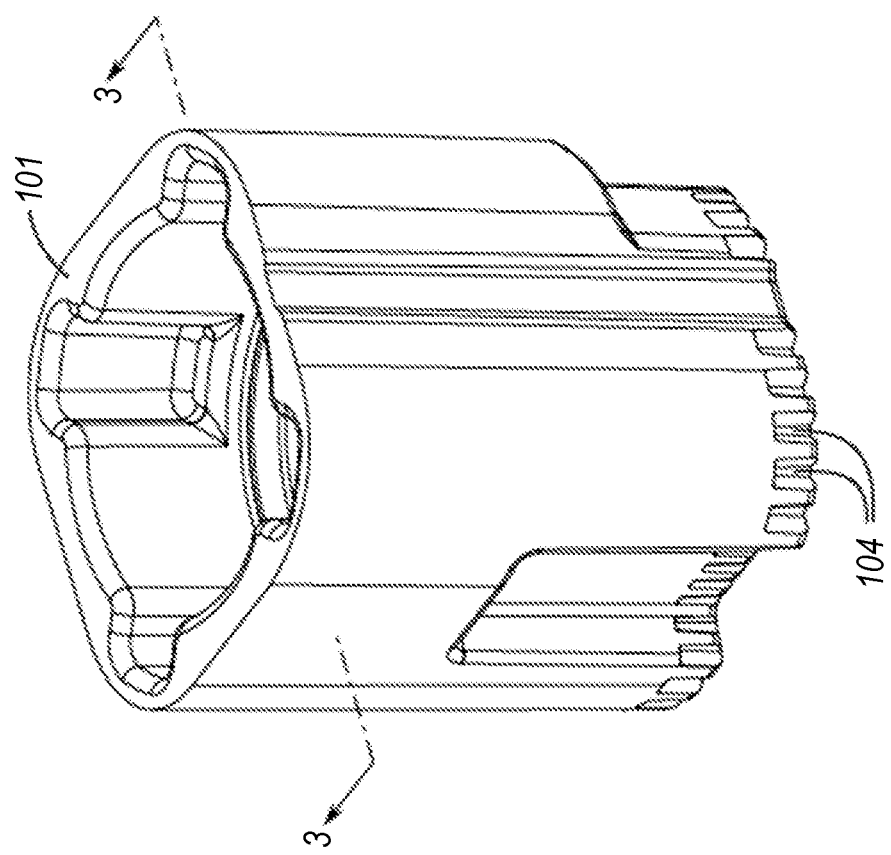
FIG. 2B
FIG. 2A

METHOD OF PRODUCING AN OPTICAL ELEMENT

CROSS-REFERENCE TO RELATED APPLICATIONS

This application claims the benefit of priority to U.S. Prov. Pat. App'n No. 62/033,353, filed Aug. 5, 2014, entitled "Method of Producing an Optical Element," which is incorporated by reference herein in its entirety.

BACKGROUND

Field

This application relates to optical elements for cameras such as infrared cameras and in particular to a low reflectivity lens mount suitable for small cameras.

Description of Related Art

The increasing availability of high-performance, low-cost uncooled infrared ("IR") imaging devices, such as bolometer focal plane arrays, is enabling the design and production of mass-produced, consumer-oriented IR cameras. IR imaging sensors have long been expensive and difficult to produce, thus limiting the employment of high-performance, long-wave imaging to high-value instruments, such as those found in aerospace, military, or large scale commercial applications. Mass-produced small IR cameras on the other hand benefit from compact, low-cost component design.

SUMMARY

Example embodiments described herein have innovative features, no single one of which is indispensable or solely responsible for their desirable attributes. Without limiting the scope of the claims, some of the advantageous features will now be summarized.

In some embodiments, a process for producing an optical element includes forming the optical element in a targeted, desired, or selected shape in a metal alloy. The process further includes deburring the metal alloy with a deburring operation and coating the deburred metal alloy element with an electrocoating operation. The process further includes mounting a lens to the formed, deburred, and electrocoated optical element.

In some embodiments, a process for producing an optical element includes casting the optical element in a targeted, selected, or desired shape in a zinc alloy; deburring the cast zinc alloy element using a thermal deburring operation; and coating the deburred zinc alloy element with an electrocoating operation.

In some embodiments, a process is provided for producing a relatively small optical element with relatively sharp surface features and relatively low reflectivity surfaces. The process includes casting the optical element in a targeted, selected, or desired shape in a zinc alloy; deburring the cast zinc alloy element using a thermal deburring operation; and coating the deburred zinc alloy element with an electrocoating operation.

In any of the processes disclosed herein, cleaning steps can be included between the casting, deburring, and/or coating operations.

In any of the processes disclosed herein and/or for any of the formed optical elements disclosed herein, the resulting relatively small optical element, or portions thereof, can have a relatively high thermal conductivity, can relatively quickly reach thermal equilibrium within an operating environment, can have relatively sharp edges and/or fine features, and/or can have a relatively low reflectivity. Similarly, the resulting optical element can be configured to be mounted on a printed circuit board. The resulting optical element can be configured to carry a lens to focus radiation onto an image sensor (e.g., a focal plane array). The resulting optical element can have a height, depth, and length that is less than or equal to about 10 mm. The resulting optical element can have portions that have a reflectivity that is less than about 2%. As a particular example, the resulting optical element can have a reflectivity that is less than about 2% for light having a wavelength between about 7.5 μm to about 13 μm (e.g., long-wavelength infrared radiation). The resulting optical element can be configured to have a combination of a sufficiently rough surface and a sufficiently thin electrocoat to provide low reflectivity from the surfaces of the element in a wavelength region of interest. The resulting optical element can be configured to have a combination of a sufficiently rough surface and a sufficiently thin electrocoat that maintains sharp physical features of the element.

In some embodiments, any of the formed optical elements disclosed herein may be a lens mount for an infrared camera core.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

FIGS. 2A and 2B illustrate views of an exemplary optical element.

DETAILED DESCRIPTION

Figure 1:
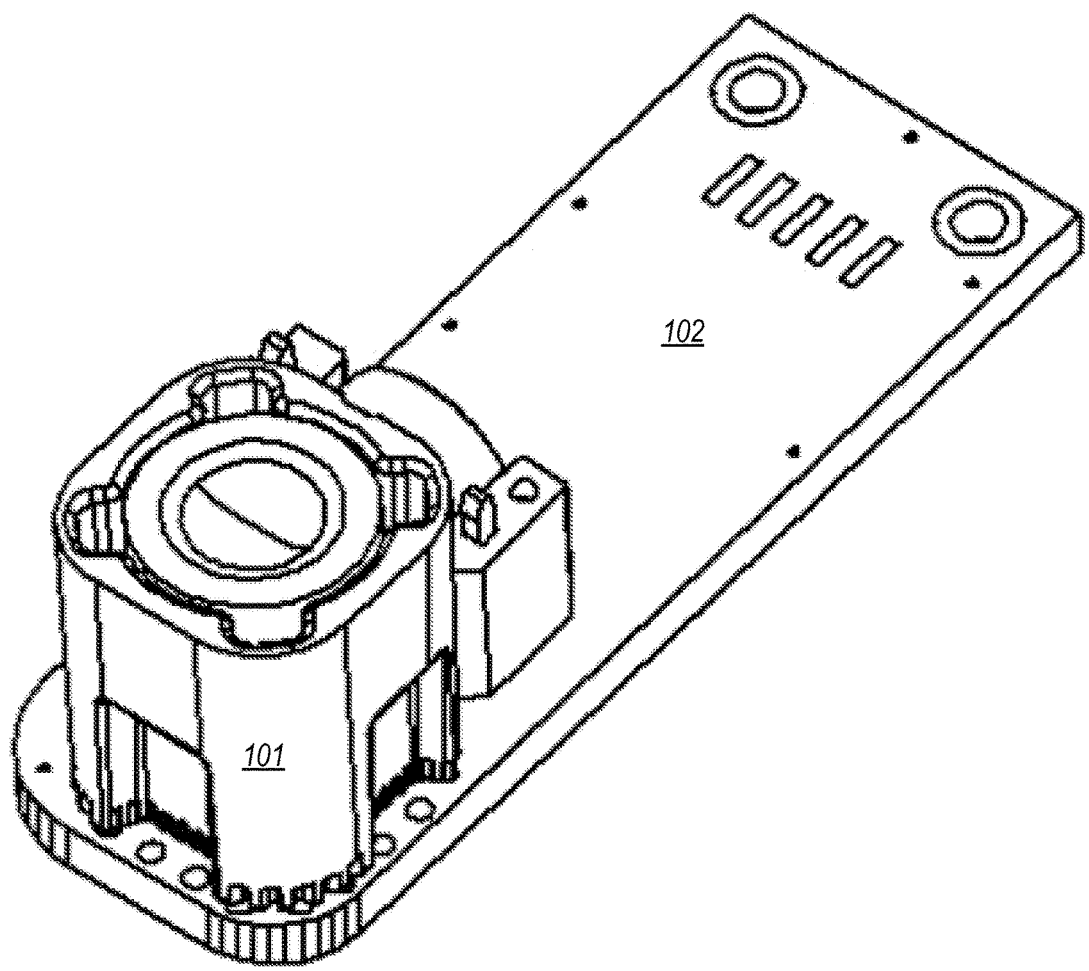
FIG. 1 illustrates a perspective view of an exemplary optical element installed in an exemplary optical system.

The several views of the drawings show exemplary embodiments of a process for producing an optical element and the resulting optical element. Variations in the process, including the order of the steps in the process, may be different than the exemplary implementations disclosed herein and still fall within the scope of this disclosure. The optical element may also include different elements arranged differently than illustrated herein that fall within the scope of this disclosure. The exemplary views and flowcharts are not intended as limiting in any way.

Some embodiments may produce a finished part having a high thermal conductivity, wherein the thermal conductivity of the finished part is configured to enable the temperature of a camera core to stabilize quickly when exposed to temperature changes, such as changes in ambient temperature. For example, the finished part can be configured to efficiently transfer heat from the environment surrounding the camera core (e.g., inside a camera) to the camera core and vice versa. Thus, the finished part can act has an efficient heat transfer system to quickly regulate changes in temperature, to quickly transfer heat energy from one place to another, and/or to provide a way for the camera core to attempt to quickly reach thermal equilibrium within a camera. For example, some implementations form an optical element using zinc alloys due at least in part to the zinc alloys having suitable thermal conductivity. As an example, zinc alloys can have a thermal conductivity that is between about 110 W/m·K and about 120 W/m·K, but other materials and alloys are contemplated that provide similar thermal conductivities as well as the other desirable properties disclosed herein, such as magnesium alloys.

Some embodiments may be used to produce an optical element suitable for use with a focal plane array (FPA). Since an FPA is sensitive to temperature, some embodiments may produce an optical element that advantageously includes background structures in the field of view of the FPA that are at a constant temperature during an image capture period. The background structures, for example, can also be anti-reflective (e.g., have relatively low reflectivities). The background structures can include, for example and without limitation, light baffles as described in greater detail herein with reference to FIGS. 2A and 2B.

Some embodiments may be used to produce an optical element for use as a lens mount that thermally stabilizes relatively quickly to reduce or minimize dynamic background temperature changes, which may adversely affect image data from an imaged scene. For example, the optical element can reach thermal equilibrium quickly due at least in part to the specific heat and/or heat diffusivity of the material used to form the optical element, the coating used to electrocoat the formed optical element, and/or the physical design of the optical element. Temperature fluctuations may adversely affect image data due at least in part to increasing the effects of thermal noise on the imaging system. For example, some implementations form the optical element using zinc alloys that can have a thermal diffusivity that is between about 35 $mm^2$/s and about 45 $mm^2$/s, but other materials and alloys are contemplated that provide similar thermal properties as well as the other desirable properties disclosed herein, such as magnesium alloys.

Some embodiments may produce an optical element having a targeted or suitable weight. For example, the targeted weight can be tailored so that the resulting optical element is neither too heavy making handling and mounting the camera core difficult nor too light making the camera core lack the heft for proper feel. Since a lens mount may be a significant fraction of a camera core's weight, the material may be selected to meet this targeted weight range. The mass of an exemplary lens mount is less than or equal to about 3 grams. Certain implementations provide an optical element with a mass that is between about 1 g and about 5 g, or any mass value within these ranges.

Some embodiments may produce an optical element with sharp edges and fine features, such as for light baffles, mounting rings, adhesive mating structures, and the like. For example, the disclosed processes can be configured to preserve sharp edges and fine features of a cast optical element. The deburring process, for example, can be configured to not significantly blunt sharp edges or otherwise degrade fine features of the cast element. Similarly, the electrocoating process can be configured to apply a sufficiently thin coat so that sharp edges and/or fine features of the deburred element are not lost or significantly degraded.

Some embodiments may produce a lens mount that has relatively low reflectivity in a spectral region of interest for the camera. This relatively low reflectivity can reduce or minimize the contribution of the lens mount and lens to the total signal captured by the FPA. In certain implementations, the spectral region of interest may be the long wave infrared atmospheric window band, which includes light with wavelengths between about 7.5 µm and about 13 µm. For example, a lens mount can have a relatively low reflectivity when those portions of the lens mount have a reflectivity that is less than or equal to about 10%, less than or equal to about 5%, or less than or equal to about 2%.

Example Optical System with Formed Optical Element

FIG. 1 illustrates an exemplary optical system 102, e.g., an infrared camera (IR) core. In an illustrative embodiment, the core shown may be on the order of an inch and a half in length, (e.g., about 4 cm). Included as part of the core is a lens mount 101, which is on the order of about 10 mm in three dimensions: length, width, and/or height. The function of the lens mount 101 may be to support a lens mounted or coupled thereto that captures and focuses IR radiation onto a focal plane array (FPA) camera sensor (e.g., an IR sensor). In some embodiments, the lens mount 101 and FPA may be mounted to a printed circuit board of the optical system 102, forming part of an IR camera core.

Example Formed Lens Mount

Two views of the exemplary lens mount 101 are illustrated in FIGS. 2A and 2B. The lens mount 101 can have a relatively complex physical shape; examples of such complex physical shapes are shown in the figures. Various features of the physical shape of the lens mount 101 may serve different purposes. For example, the physical features can act as light baffles, mounting rings, adhesive mating structures, or the like. The illustrated lens mount 101 has an exemplary shape and exemplary surface features. These are included as mere illustrations of potential shapes and surface features. However, as should be understood by one of ordinary skill in the art, alternative shapes, sizes, and surface features are contemplated in other embodiments and included within the scope of this disclosure.

Figure 3:
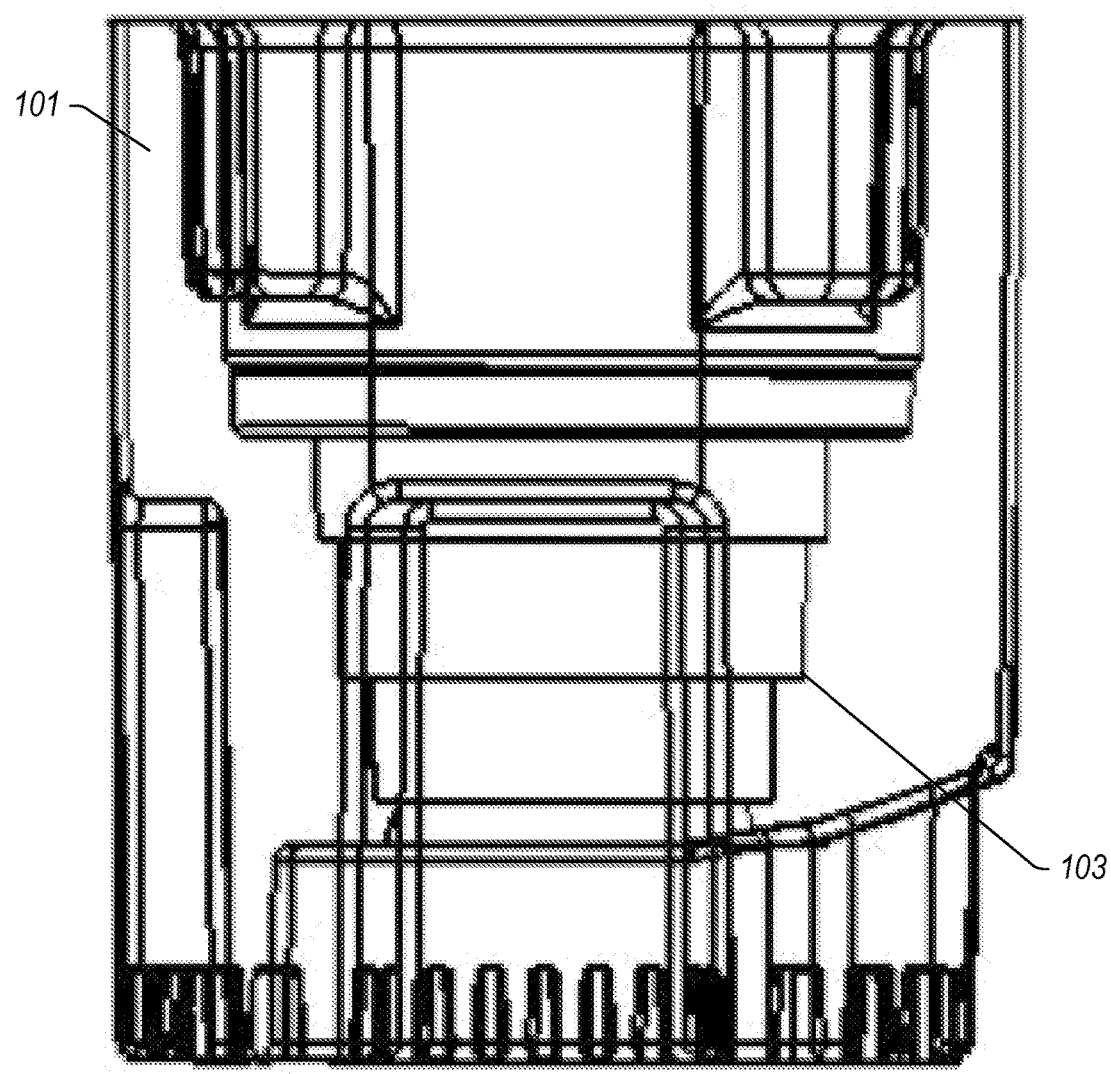
FIG. 3 illustrates a cross-sectional view of the exemplary optical element of FIGS. 2A and 2B.

FIG. 3 illustrates a cross-section of lens mount 101, the lens mount 101 including light baffle structures 103. The light baffle structures 103 are examples of structures that are formed with precisely defined edges. In some embodiments, the corners of the light baffle structures 103 are configured to be formed with precise edges. This can be done to reduce stray reflections reaching the FPA. One challenge in forming such optical elements is that it can be difficult to maintain the sharpness of formed features during other processes of finishing the optical element. For example, deburring and/or coating the formed element may degrade the sharpness of edges or otherwise degrade fine features of the element as formed. These challenges may be even more pronounced when forming optical elements of the relatively small size, as described herein. Other surface features that may benefit from the ability to form and preserve precisely defined structures are the glue wicking crenellations 104, examples of which are illustrated in FIGS. 2A and 2B. These glue wicking crenellations 104 can be formed and then maintained during the deburring and electrocoating steps, for example.

A metal alloy may be used for the material of the optical element. For example, a zinc alloy can be used (e.g., a zinc alloy known as Zamak 3 is suitable). The zinc alloy may comprise an alloy of zinc and aluminum. The zinc alloy may further comprise magnesium, copper, and/or other alloying elements. Other metal alloys are contemplated such as magnesium, etc. The zinc alloys may be advantageous for use with the described optical elements due at least in part to their relatively high thermal conductivity. Other advantageous features of such zinc alloys include, for example and without limitation, that they may be cast relatively inexpensively, form sharp edges and fine features when cast, and/or may be a suitable weight, as described herein.

In a particular example, the optical element may be formed (e.g., through a casting process) using a zinc alloy known as Zamak. After forming the optical element from Zamak, the optical element can be deburred. The deburring used in the manufacturing processes described herein can be configured to not significantly materially degrade the small sharp features formed in the optical element during initial fabrication. For example, the deburring process can be a thermal deburring process that can be operated within a pressure range that results in desirable or targeted surface roughness (e.g., to provide a targeted reflectivity and/or emissivity) while reducing or eliminating undesirable degradation of edges or other fine features. In addition, the electrocoating used in the manufacturing processes described herein can be configured to maintain the small, sharp features formed in the optical element due at least in part to the ability to control the thickness of the coating. For example, the thickness of the coating can be controlled to be at least about 10 μm and/or less than or equal to about 25 μm, at least about 15 μm and/or less than or equal to about 20 μm, or any value within these ranges.

Example Process for Forming an Optical Element

Figure 4:
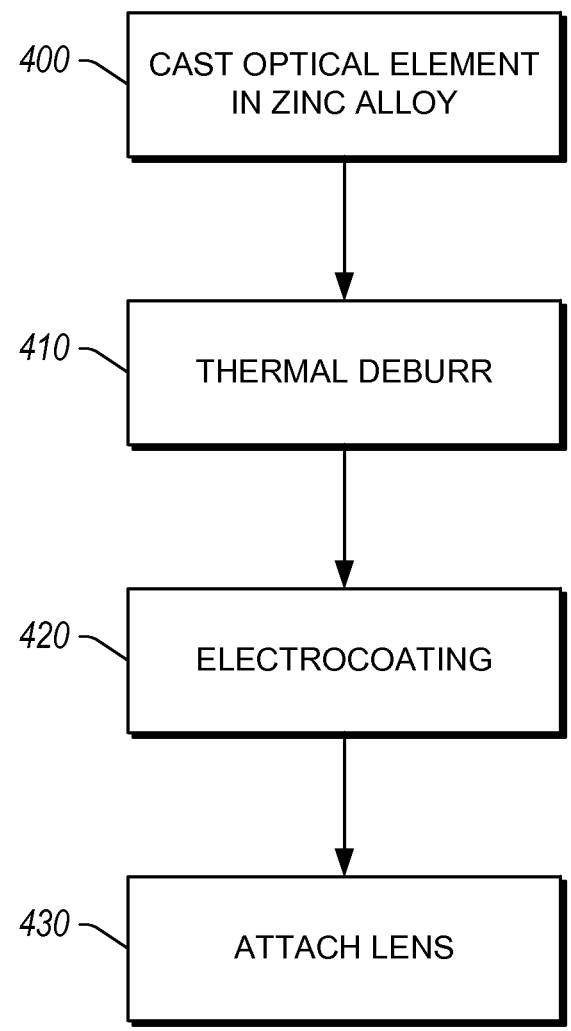
FIG. 4 illustrates a flowchart of an example process for producing an optical element.

FIG. 4 illustrates a flowchart for an example process configured to achieve the targeted properties described herein. The process can be configured to form an optical element for use in a camera core. For example, the optical element can be used as a lens mount. As another example, the optical element can be mounted to a printed circuit board that includes an image sensor (e.g., a focal plane array). The optical element can be configured to provide advantageous features to the camera core. For example, the optical element can be configured to support a lens or lenses while also providing light baffles with precisely defined edges. As another example, the optical element can support the lens or lenses and can be configured to have a relatively low reflectivity. As another example, the optical element can have thermal properties that enable, for example and without limitation, the camera core to reach thermal equilibrium relatively quickly, features of the optical element to maintain a relatively constant temperature during image acquisition, the optical element to reduce the effects of background temperature fluctuations on an image sensor, and the like. As an example, the optical element can have physical features that reduce stray reflections within the optical element that may affect image data at the image sensor.

In step 400, the part is cast from a zinc alloy. Alternative fabrication processes are contemplated for forming the part. For example and without limitation, the part, e.g., an optical element, may be machined, forged, stamped, rolled, extruded, sintered, etc., or produced using a combination of one or more of these fabrication processes. In some embodiments, the part may formed into a structure that is relatively small, for example, a structure that is less than about 10 mm in length and less than about 7 mm in width. The casting process can be used to form a relatively small part with precisely defined edges or other similar sharp features, as described in greater detail herein.

In step 410, the formed part is subjected to a thermal deburr. Other deburr methods are contemplated. For example and without limitation, the part can be deburred using mechanical deburring (e.g., vibratory deburring, etc.), electrochemical deburring, or the like. A suitable deburring process can depend at least in part on the material of the part and/or the fabrication method used in step 400. For example, for the zinc alloy, a range of operating parameters for the deburr can be used to achieve one or more of the advantageous features described herein. In certain implementations, a chamber charging pressure may range from about 30 psi to about 120 psi. The lower value of the pressure range can be configured to be a pressure below which the part is not deburred. Similarly, the upper value of the pressure range can be configured to be a pressure above which the part may be damaged by the deburring process. It is noted that the reflectivity of the deburred part was observed to depend at least in part on the pressure used during the deburr operation. In certain embodiments, a pressure of about 90 psi unexpectedly produces particularly advantageous results. For example, the formed part deburred at a pressure of about 90 psi can result in a deburred part that has a relatively low reflectivity while preserving the precisely defined edges and/or sharp features of the relatively small formed part. The pressure range between about 30 psi and about 110 psi results in a suitable range of surface roughening and varying reflectivity. It is noted that this occurs due at least in part to the thermal deburr process roughening the zinc alloy surface to varying degrees, the degree of roughening depending at least in part on operating parameters such as pressure. Operating the deburr process in this pressure range can result in a particular surface roughness that significantly reduces the reflectivity of the formed part in the relevant wavelength range. In certain embodiments, the deburr process may be accomplished in a Bosch Thermal Deburring machine using a methane-oxygen atmosphere, for example, preferably at a ratio of 16:1 methane to oxygen. Alternative gases or combinations thereof may be used, depending on the specific deburring machine or process.

Other deburr parameters may be varied in different embodiments, such as the volume of gas injected into the chamber and the ratio of fuel to oxygen.

In step 420, the formed part is subjected to an electrocoating process. The electrocoating process may be any of a variety of electrophoretic deposition techniques, such as cathodic electrodeposition, anodic electrodeposition, electrophoretic coating, electrophoretic painting, or the like. Electrocoating may comprise suspending colloidal particles in a liquid medium that migrate under the influence of an electric field (electrophoresis) and are deposited onto an electrode. Electrocoating may allow for relatively precise control of coating thickness of a paint-like material. Thus, an electrocoat can be applied having a targeted thickness. For example, the electrocoat can be thin enough to maintain the fidelity of the targeted sharp-edged features. As another example, the electrocoat may have relatively low reflectivity at wavelengths of interest (e.g., wavelengths between about 7.5 μm and about 13 μm). The electrocoat may be applied at a controlled thickness of between about 20 μm and about 25 μm, between about 10 μm and about 25 μm, or preferably at a thickness of about 20 μm. White electrocoat is preferred, but the other colors such as olive green, etc. may be used as well.

In some embodiments, the result of the specific roughness produced by the thermal deburr step coupled with the relatively thin electrocoat may produce a deburred part that maintains sharp features, and that has a reflectivity that is lower than achieved with either process alone. The formed, deburred, and electrocoated part can have sharp features, precisely defined edges, and/or low reflectivity with a relatively small size that is, for example and without limitation, less than or equal to about 10 mm on a side.

In step 430, the finished part is produced by mounting a lens to the lens mount.

Although not shown, appropriate cleaning steps could be applied before and/or after each step.

Although the foregoing disclosure includes the description of illustrative embodiments, those of ordinary skill in the art will understand and appreciate the existence of variations, combinations, and equivalents of the specific embodiments, methods, and examples disclosed herein. For example, alternative materials, even non-metallic materials, may be used for forming the optical element. The scope of the claims should therefore not be limited by the above described embodiments, methods, and examples, but by all embodiments and methods within the scope and spirit of the disclosure.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments whether these features, elements and/or states are included in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y, and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

While the above detailed description has shown, described, and pointed out novel features as applied to illustrative embodiments, it will be understood that various omissions, substitutions, and changes in the form and details of the devices illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A process for producing an optical element, the process comprising:
    casting zinc alloy using a casting mold, the casting mold comprising a void in a targeted shape of the optical element, the targeted shape including one or more features in an interior portion of the optical element, wherein a total height, length, and width of the optical element are each less than or equal to about 10 mm;
    deburring the cast zinc alloy element with a thermal deburring operation, the thermal deburring operation performed at a charging pressure between about 30 psi and about 110 psi, the thermal deburring operation configured to preserve physical features of the one or more features in the interior portion of the optical element; and
    coating the deburred zinc alloy element with an electrophoretic deposition operation configured to apply a substantially white coating having a thickness between about 10 μm and about 25 μm,
    wherein the interior portion of the optical element has a reflectivity that is less than or equal to about 5% for long-wavelength infrared light.

2. The process of claim 1 further comprising cleaning steps between the casting, deburring, or electrophoretic deposition operation.

3. The process of claim 1, wherein the deburring operation is performed at a charging pressure of about 90 psi in a methane-oxygen atmosphere with a methane to oxygen ratio of about 16 to 1.

4. The process of claim 1, wherein the electrophoretic deposition operation comprises applying a coating having a thickness between about 20 μm and about 25 μm.

5. The process of claim 1, wherein the coating has a thickness of about 20 microns.

6. The process of claim 1, wherein the optical element is a lens mount for an infrared camera core.

7. The process of claim 6, wherein the lens mount is less than or equal to about 10 mm long and less than or equal to about 7 mm wide.

8. The process of claim 1, wherein the zinc alloy is Zamak3.

9. A process for producing an optical element, the process comprising:
    forming the optical element in a targeted shape in a metal alloy, the targeted shape including an interior portion that includes one or more physical features;
    deburring the metal alloy with a thermal deburring operation performed at a charging pressure between about 30 psi and about 110 psi, the deburring operation configured to roughen a surface of the interior portion of the optical element and configured to preserve physical features of the one or more features in the interior portion of the optical element;
    coating the deburred metal alloy element with an electrophoretic deposition operation configured to apply a coating with a thickness that is less than or equal to about 25 μm, such that a combination of the deburring and coating steps result in the optical element having a reflectivity that is less than or equal to about 10%; and
    mounting a lens to the optical element such that the lens is configured to direct light through the interior portion of the optical element.

10. The process of claim 9 further comprising mounting the optical element to a printed circuit board having an infrared sensor coupled thereto.

11. The process of claim 9, wherein thermal deburring is performed at a charging pressure between about 70 psi and about 100 psi.

12. The process of claim 11, wherein the electrophoretic deposition operation comprises coating the optical element with a material having reflectivity less than or equal to about 5% at wavelengths between about 7.5 μm and about 13 μm.

13. The process of claim 12, wherein the material has a reflectivity of less than about 2%.

14. The process of claim 9, wherein the targeted shape comprises a plurality of light baffle elements in the interior portion of the optical element, the light baffle elements defining a stepwise narrowing of the interior portion.

15. The process of claim 9, wherein the metal alloy is a zinc alloy.

16. The process of claim 9, wherein the optical element is formed by casting.

17. The process of claim 9, wherein the formed optical element weighs less than about 3 grams.

\* \* \* \* \*